Sept. 13, 1966 C. E. HENDERSHOT 3,273,118
ACCIDENT ILLUMINATING DEVICE
Filed Dec. 10, 1962 3 Sheets-Sheet 1

INVENTOR.
CHARLES E. HENDERSHOT
BY
Lockwood, Woodard, Smith & Weikart
Attorneys

Sept. 13, 1966   C. E. HENDERSHOT   3,273,118
ACCIDENT ILLUMINATING DEVICE
Filed Dec. 10, 1962   3 Sheets-Sheet 2
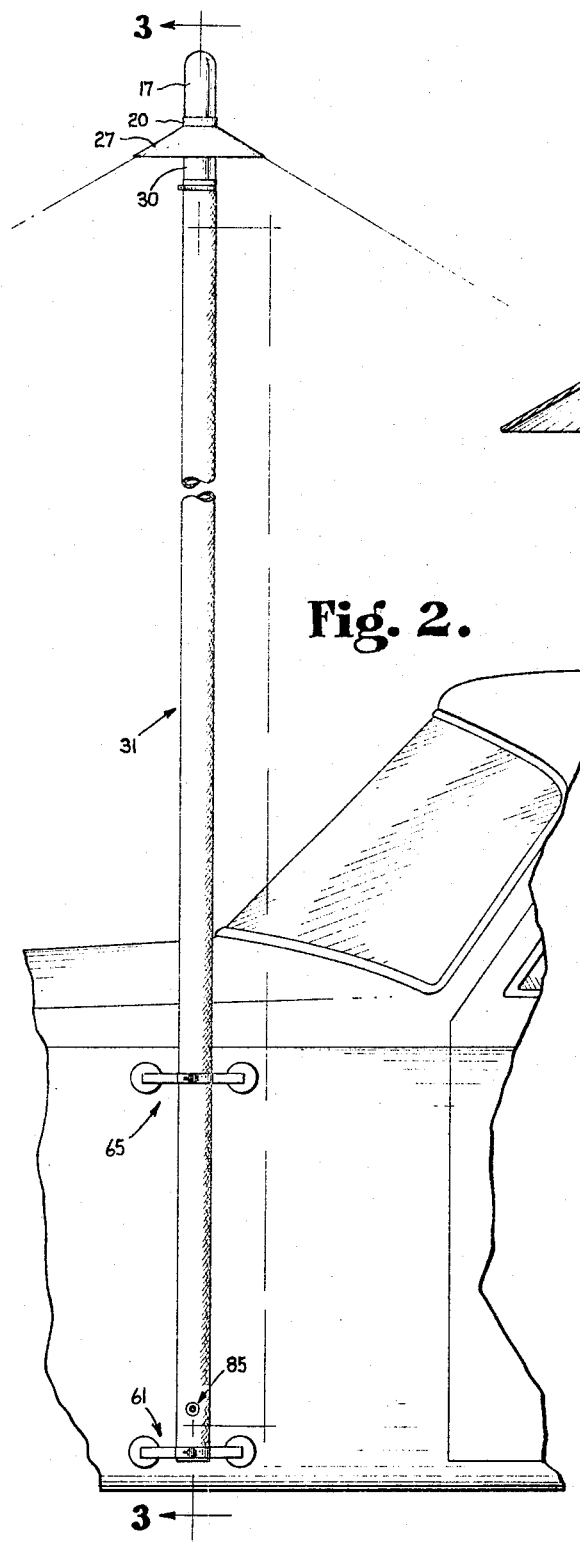
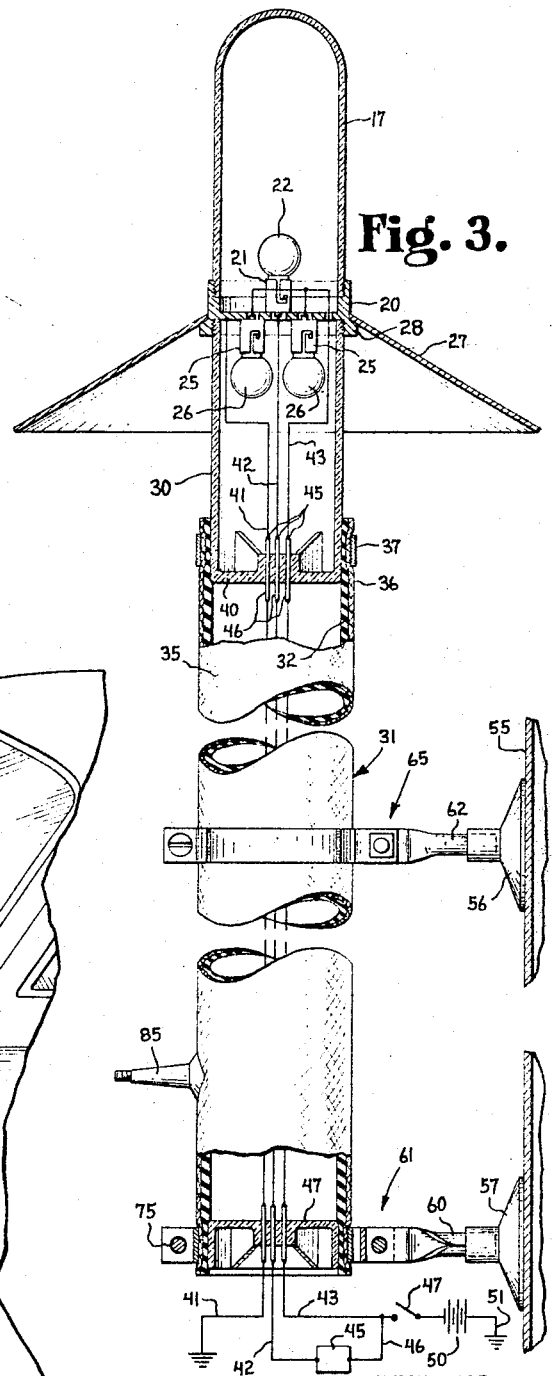
INVENTOR.
CHARLES E. HENDERSHOT
BY
Lockwood, Woodard, Smith & Weikart
Attorneys INVENTOR.
CHARLES E. HENDERSHOT
BY
Lockwood, Woodard, Smith & Weikart
Attorneys United States Patent Office 3,273,118
Patented Sept. 13, 1966

3,273,118
ACCIDENT ILLUMINATING DEVICE
Charles E. Hendershot, Nashville, Ind., assignor, by direct and mesne assignments, to Nitehawk, Inc., Zionsville, Ind., a corporation of Indiana
Filed Dec. 10, 1962, Ser. No. 243,324
5 Claims. (Cl. 340—89)

The present invention relates to an illuminating device and particularly to a device for illuminating an automobile accident scene and for warning oncoming motorists on the highway that an accident has occurred so that they will use caution in approaching the scene of the accident.

It is frequently the case that serious accidents occur in the country at night far from any suitable means of illumination. In certain cases, the automobiles involved are damaged to an extent that they cannot be removed from the road. Also, the people involved in the accident may be thrown from the automobiles and may be lying on the ground in severely injured condition. Thus, I believe there is a great need for suitable means to illuminate the accident scene in order that the police and medical personnel can better perform their duties and to warn oncoming motorists to slow down so that a further accident does not occur and so that further injury is not caused. It is also desirable that such means be capable of fast erection or operation after it has become evident that the accident has occurred in order to prevent further accidents from occurring and in order to make possible rapid rendering of first aid.

Consequently, one object of the present invention is to provide an improved illuminating device.

Still another object of the present invention is to provide a device for illuminating the accident scene and for warning oncoming motorists.

A further object of the present invention is to provide an illuminating device of the above nature which can be rapidly assembled and placed in operation at an accident scene or other desired location.

Related objects and advantages will become apparent as the description proceeds.

One embodiment of the present invention might include an accident illuminating device comprising a downwardly opening reflector, means for supporting the reflector above the accident scene, a light mounted within the reflector and positioned to reflect light against the reflector for illuminating the accident scene, and a blinker mounted on top of the reflector for warning oncoming drivers.

The full nature of the invention will be understood from the accompanying drawings and the following description and claims.

FIG. 2 is a fragmentary side elevation of one of the automobiles of FIG. 1 showing the accident illuminating device of the present invention mounted thereon.

FIG. 3 is a vertical section partially in elevation taken along the line 3—3 of FIG. 2 in the direction of the arrows.

Figure 4:
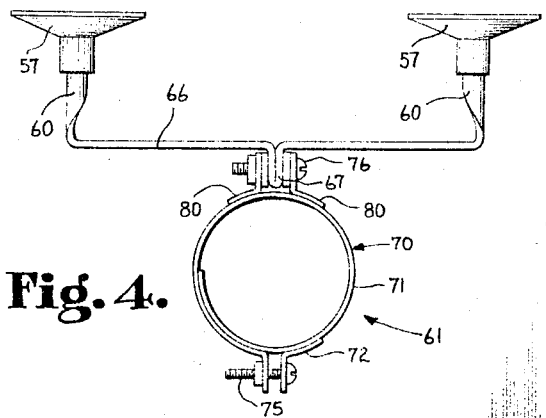
FIG. 4 is a top plan view of a mounting arrangement forming a part of the embodiment of FIGS. 1—3.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustarted therein being contemplated as would normally occur to one skilled in the art to which the invention relates.

Referring more particularly to the drawings, there is illustrated a police car 10 which is located at the scene 11 of an accident and which has mounted thereon an accident illuminating device 12. As is suggested in FIG. 1, the accident illuminating device 12 includes illuminating means 15 which effectively lights the accident scene by means of conical zone of light 18. The apparatus 12 also includes a red warning light 16 for notifying oncoming motorists that an accident has occured and that they should check their speed.

Referring more particularly to FIGS. 2 and 3, the illuminating apparatus includes a red transparent dome 17 which is threadedly mounted at its lower end within a base 20. The base mounts an upwardly projecting socket 21 which, in turn, mounts an upwardly projecting light bulb 22. The dome 17 encloses the bulb 22 so that light emitted thereby produces a red glow externally of the dome 17.

Also mounted on the base 20 is a pair of downwardly projecting sockets 25 which receive downwardly projecting light bulbs 26. A frusto-conically shaped reflector 27 is friction mounted on the base 20 so as to bear against the flanged lower end 28 thereof and extends outwardly and downwardly therefrom. The base 20 is internally threaded at its lower end to receive a transparent cylinder 30 which encloses the light bulbs 26. It can be appreciated that light from the bulbs 26 will be reflected outwardly and downwardly by the reflector 27 in the manner suggested in FIG. 1.

Figure 1:
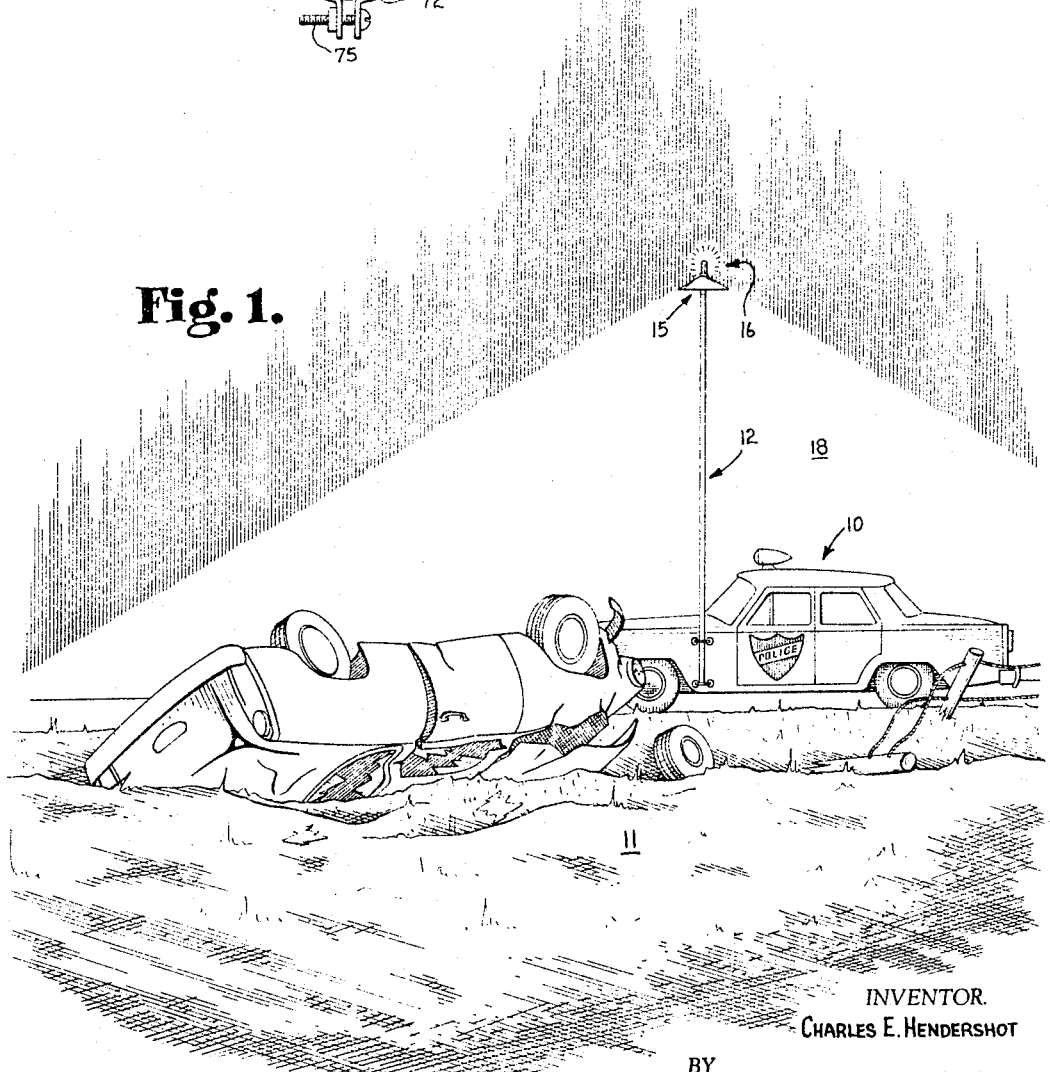
FIG. 1 is a perspective view of an accident scene showing the illuminating device of the present device in operation.

An elongated flexible tube 31 is rapidly inflatable in order to raise the illuminating device 15 and warning light 16 to the positions of FIGS. 1 and 2. The tube 31 may be formed of commercially available flexible tubular material which includes an internal rubber or plastic layer 32 and an external fabric layer 35. Thus, the tube is not elastic but is instead flexible. In other words, when inflated, the tube becomes stiff and rigid rather than expanding as does a toy balloon. The tube 31 is clamped at its upper end 36 to the cylinder 30 by a suitable clamp 37 received about the upper end of the tube and the lower end of cylinder 30.

The lower end of the cylinder has a closed central part 40 through which extends three electrical leads 41, 42 and 43 which are connected to the light bulbs 22 and 26. The lead 41 is a ground wire for the bulbs, the lead 42 supplies current for the bulb 22 and the lead 43 supplies current for the bulbs 26. The wires 41–43 can be permanently connected and soldered at the points 45 or the members 46 can incorporate removable plugs and sockets which permit disassembly of the cylinder 30 and the structure above the cylinder from the tube 31.

The wires 41–43 extend longitudinally internally of the tube and through the central portion of a closure member 47. The remaining portion of the electrical circuit of the apparatus is shown schematically in FIG. 3. The wire 41 may be grounded in any suitable manner to the automobile while the wire 42 leads to a blinker switch 45.

The term "blinker switch" is used herein to designate a conventional electrical switch which automatically and repeatedly makes and breaks the circuit when a voltage is placed across the switch. A wire 46 is connected to the other side of the blinker switch and leads to the wire 43. The device may be turned on and off by a conventional switch 47 which is in series with and controls power to the wire 43 from the standard battery power supply 50 of the automobile which, of course, is grounded to the automobile at 51.

Because of the blinker switch 45, power is supplied intermittently to the electric light 22 so that the light and dome combination functions as a blinker light. At the same time that power is being supplied to the light 22, power is also supplied continuously to the lights 26, thus lighting the accident scene as shown in FIG. 1.

Figure 7:
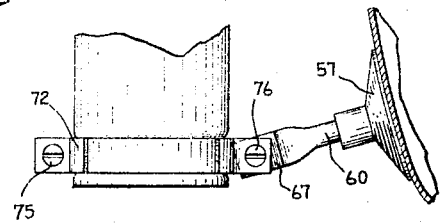
FIG. 7 is a fragmentary view of the lower portion of the mechanical structure illustrated in FIG. 3 showing a different operating position of the structure for a differently contoured automobile.

The tube 31 may be mounted upon the side 55 of an automobile by means of suction cups 56 and 57. The suction cups 57 are received upon the projecting ends 60 of a clamping assembly 61 while the suction cups 56 are received upon the projecting ends 62 of a clamping assembly 65. The clamping assembly 61 and 65 are identical and a representative one is shown in FIGS. 4 and 7. It will be noted that each clamping assembly includes a pair of suction cups. The projecting portions 60 are joined by a straight bar 66 having a folded portion 67 therein. The clamping device per se 70 is pivotally mounted upon the folded portion 67 and includes the curved member 71 which is fixed near one end to a bracket 72 having a bolt 75 extending therethrough. The bolt also bears against the other end of the member 71 so that the clamping device can be tightened against the tube 31. The bolt 76 extends through the fold 67 and through brackets 80 fixed to the member 71.

In the case of the lower clamping assembly 61, when the clamp is tightened, it bears against the member 47, thus firmly sealing off any leakage of air between the tube 31 and the member 47. A member (not shown) similar to the member 47 but having an open central portion is provided within the tube in order to act as a bearing surface to insure that the clamping assembly 65 is securely attached to the tube 31 whether or not the tube is inflated.

The tube 31 can be inflated by means of air from the tires of the police car or air from the tires of one of the cars in the accident or by means of a suitable compressor. When the accident illuminating device is not in use, it can be deflated and, because of its small size when deflated, easily stored in the trunk of the police car. It will be noted that the tube 31 can be inflated and deflated by means of the conventional valve assembly 85 extending from the sidewall of the tube 31 and that such inflation or deflation is accomplished in the same manner as is the inflation or deflation of the tires of an automobile. If the tires of an automobile are used to inflate the tube 31, preferably a hose is used which can be screwed onto the valve 85 and the valve of the automobile tire.

Figure 5:
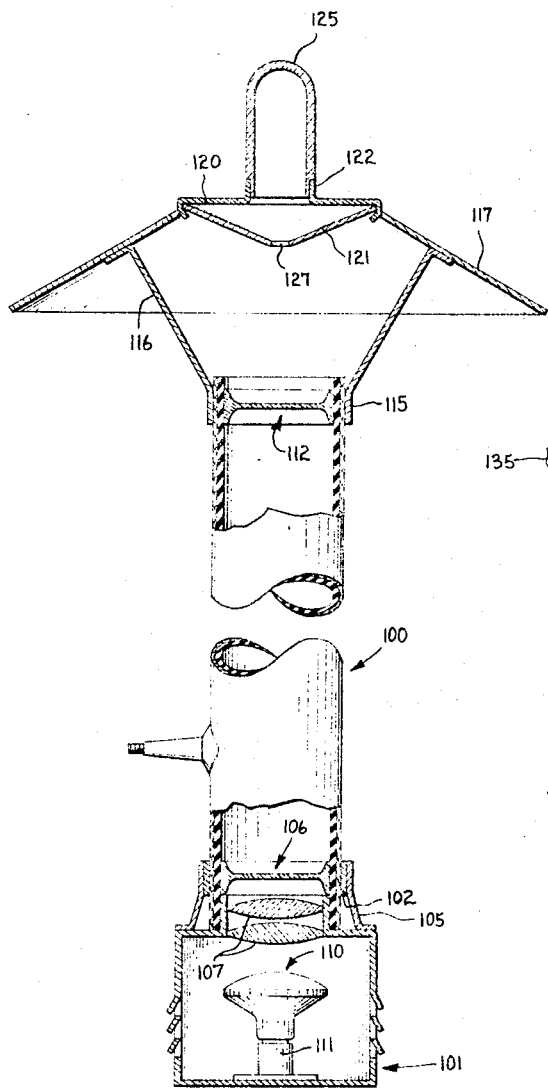
FIG. 5 is a fragmentary side elevation partially in vertical section of an alternative embodiment of the present invention.

Referring to FIG. 5, an alternative embodiment of the invention includes a tube 100 substantially identical to the tube 31 above described. The tube 100 is mounted upon a box 101 by means of a clamp 102 which is secured to a brace 105 in turn secured to the top of the box 101. The clamp 102 bears against the tube 100 and against the external periphery of a transparent disc 106 received within the tube 100 thereby sealing off any leakage of air out of the bottom of the tube.

A pair of conventional collimating lenses 107 are mounted in the upper portion of the box 101 and function to make parallel the rays of light passing upwardly from a seal beam lamp 110 mounted within a suitable socket 111 in the box 101. As a result of the lenses 107, the light from the seal beam 110 is formed into a plurality of parallel rays which pass directly upwardly through the flat transparent disc 106, through the interior of the tube 100 and through a further disc 112 identical to the disc 106.

The disc 112 functions to close off the upper end of the tube 100 and bears against a clamp 115 having secured thereto radially and upwardly extending mounting elements 116. The mounting elements support a downwardly opening frusto-conical reflector 117 which is fixedly mounted upon a base 120 which also mounts a frusto-conical light-dispersing reflector 121. The base 120 is annular in shape and has an upturned flange 122 which mounts a red transparent dome 125.

Figure 8:
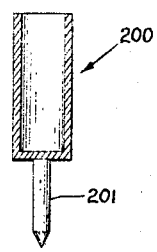
FIG. 8 is a side elevation partially in vertical section of a device for mounting the illuminating device of the present invention.

Thus, the light from the lenses and seal beam moves directly upwardly until the major portion of it strikes the reflector 121 whereby it is deflected outwardly and downwardly. This portion of the light is redirected downwardly in a similar fashion to the arrangement of FIG. 1 by the reflector 117. A minor portion of the light coming from the seal beam and the lenses passes through the small opening 127 in the center of the dispersing reflector 121 and continues its upward movement until it strikes the red transparent dome 125 whereupon it produces a red glow externally of the dome. It can be appreciated that the present embodiment of the invention is not capable of producing a blinking action of the red dome as well as a simultaneous continuous lighting of the accident scene. If desired, the embodiment of FIG. 5 may be mounted on the side of an automobile in the manner described above. It should be mentioned, however, that either of the above described embodiments can be mounted in various other fashions upon an automobile or in or on the ground. For example, a receptacle 200 (FIG. 8) similar to a flag holder and having a pointed projection 201 on the lower end thereof can be driven into the ground to receive the lower end of the device of FIG. 3. Thus, the portions 60 and 62 are removed from the lower end of the illuminating device of FIG. 3 in order to permit insertion of the lower end into the receptacle 200.

Figure 6:
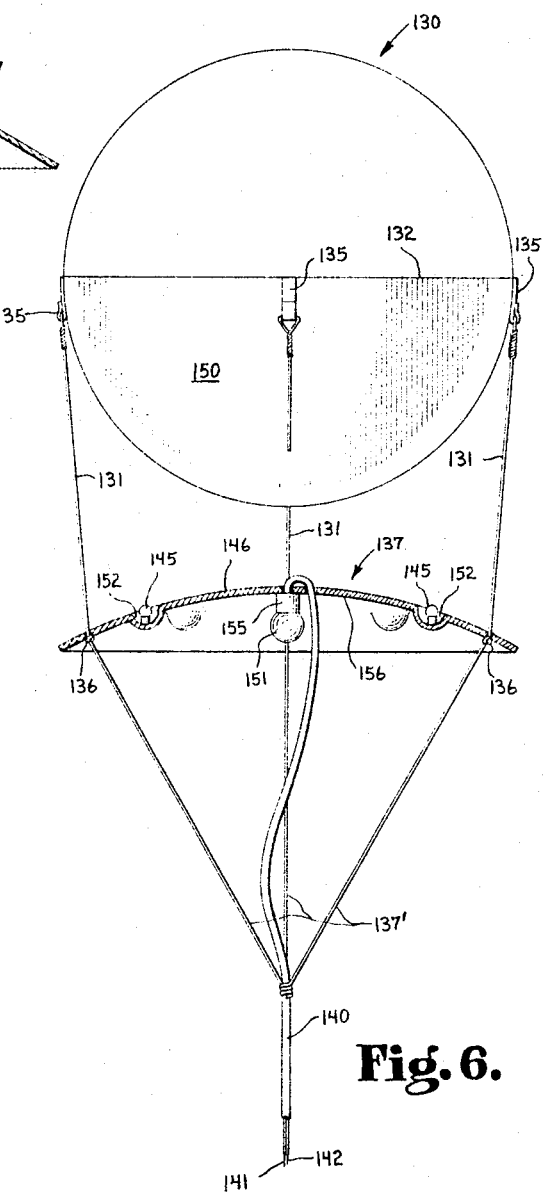
FIG. 6 is a side elevation partially in vertical section of a further alternative embodiment of the present invention.

Referring to FIG. 6, there is illustrated still a further embodiment of the invention, said further embodiment including a spherical balloon 130 filled with helium. The balloon has a plurality of lines 131 secured thereto at the great circlie 132 of the sphere. The attachment of the lines 131 can be by means of loops 135 secured to the great circle 132. The lines are knotted at 136 to support a reflector 137 which is concave in shape and opens downwardly.

The lower ends 137' of the lines 131 are secured to an electrical cord 140 which may include three insulated wires similarly to the arrangement of FIGS. 1–3 or may include only two insulated wires 141 and 142. If a three-wire arrangement is provided, the lights 145 mounted upon the convex upper surface 146 of the reflector can be used to repeatedly turn on or off for lighting up the lower surface 150 of the balloon. In such an embodiment, the light 151 would turn continuously.

Alternatively, the lights 145 and 151 can be both supplied continuously with power whereby the lower portion 150 of the balloon is continuously lighted and the light 151 continuously illuminates the accident scene.

The lower surface 150 of the balloon may be painted with red phosphorescent paint or possibly with red, highly reflective paint. The lights 145 are mounted within suitable sockets which are, in turn, mounted within relatively small recesses 152 in the upper convex surface 146 of the reflector. The light 151 is mounted within a suitable socket 155 secured to the lower surface 156 of the reflector at the axis thereof. The balloon 130 is secured to a police car or the like by means of the electrical cord 140 and may be stored, if desired, within the trunk of the police car.

It should be mentioned that the accident illuminating device of the present invention can also be used to support an aerial, for example, for a television receiver or transmitter or for a radio receiver or transmitter.

It should be mentioned that the power supply to the lights should be at a sufficient voltage to eliminate the necessity of heavy wire being supported in the air by any of the above described embodiments. Thus, the weight of a thirty foot long wire could be reduced by eighty-five times if the voltage is stepped up from D.C. twelve to 110 volts alternating at 60 to 100 cycles per second. A conventional vibrator-transformer system can be used for this purpose.

From the above description, it will be evident that the present invention provides an improved illuminating device which is particularly useful for warning oncoming motorists on a highway that an accident has occurred so that they will use caution in approaching the scene of the accident. It will also be evident that the accident illuminating device of the present invention is particularly useful in situations where there are no street lights and where it is necessary to rapidly render first-aid and to remove damaged vehicles from the roadway.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An accident illuminating device for use with an automobile, said device comprising a red transparent dome; a base; a first light socketed therein and projecting upwardly therefrom; a second light socketed therein and projecting downwardly therefrom; said dome being secured to said base, projecting upwardly therefrom and enclosing said first light; a frusto-conical reflector secured about said base and opening downwardly; a transparent cylinder threaded into said base and projecting downwardly therefrom and from within said reflector, said cylinder enclosing said second light; a flexible elongated tube having one end received about the lower end of said cylinder; means clamping said tube in airtight relation to said cylinder; said cylinder having a closed bottom which closes off the upper end of said tube, and means clamping off the lower end of said tube.

2. An accident illuminating device for use with an automobile, said device comprising a red transparent dome; a base; a first light socketed therein and projecting upwardly therefrom; a second light socketed therein and projecting downwardly therefrom; said dome being threadedly received in said base, projecting upwardly therefrom and enclosing said first light; a frusto-conical reflector secured about said base and opening downwardly; a transparent cylinder threaded into said base and projecting downwardly therefrom and from within said reflector, said cylinder enclosing said second light; a flexible elongated tube having one end received about the lower end of said cylinder; a first clamp surrounding said one end of said tube and said cylinder and clamping said tube in airtight relation to said cylinder; said cylinder having a closed bottom which closes off the upper end of said tube; a closure member received within the other end of said tube; a second clamp surrounding the closure member and said tube and clamping off the lower end of said tube.

3. An accident illuminating device for use with an automobile, said device comprising a red transparent dome; a base; a first light socketed therein and projecting upwardly therefrom; a second light socketed therein and projecting downwardly therefrom; said dome being threadedly received in said base, projecting upwardly therefrom and enclosing said first light; a frusto-conical reflector secured about said base and opening downwardly; a transparent cylinder threaded into said base and projecting downwardly therefrom and from within said reflector, said cylinder enclosing said second light; a flexible elongated tube having an upper end received about the lower end of said cylinder; a first clamp surrounding said one end of said tube and said cylinder and clamping said tube in airtight relation to said cylinder; said cylinder having a closed bottom which closes off the upper end of said tube; a closure member received within the other end of said tube; a second clamp surrounding the closure member and said tube and clamping off the lower end of said tube, suction cup means mounted on said second clamp for securing it to said automobile, further suction cup means secured to said tube between said clamps for securing said tube to said automobile in upright fashion, a first power source of repeated pulses of electrical power, a second power source of continuous electrical power, wiring connecting said first power source to said first light and connecting said second power source to said second light.

4. An accident illuminating device which comprises a first downwardly opening reflector; a second annular dispersing reflector received within said first reflector coaxially thereof; a base positioned above said reflectors fixing them together and having a central opening therethrough; a red transparent dome mounted on said base, projecting upwardly therefrom and covering said opening; an inflated upright elongated tube, means securing said first reflector in spaced relation to the upper end of said tube; a light source at the bottom of said tube; lenses mounted within said box and directing the light up said tube against said dispersing reflector, thence to said first reflector, thence to the accident scene; a portion of said light being directed upwardly through said dispersing reflector to illuminate said dome.

5. An accident illuminating device which comprises a first frusto-conical downwardly opening reflector; a second frusto-conical downwardly converging dispersing reflector received within said first reflector coaxially thereof; a base positioned above said reflectors fixing them together and having a central opening therethrough; a red transparent dome mounted on said base, projecting upwardly therefrom and covering said opening, an inflated flexible upright straight elongated tube, a mounting member securing said first reflector in spaced relation to the upper end of said tube, a transparent disc received in said upper end, said mounting member including a clamp surrounding said upper end and disc and sealing off the end of said tube, a further transparent disc received in the lower end of said tube, a box secured to the lower end of said tube, a light source inside of said box, lenses mounted within said box and directing the light up said tube against said dispersing reflector, thence to said first reflector, thence to the accident scene, a portion of said light being directed upwardly through said dispersing reflector to illuminate said dome for warning oncoming motorists.

References Cited by the Examiner

UNITED STATES PATENTS

| | | | |
|---|---|---|---|
| 1,285,940 | 11/1918 | Chodakowski | 343—880 |
| 2,097,900 | 11/1937 | Strauss | 340—902 |
| 2,173,095 | 9/1939 | Byrne | 343—902 |
| 2,212,128 | 8/1940 | Richter | 343—902 |
| 2,420,772 | 5/1947 | Dalton | 340—87 |
| 2,599,705 | 6/1952 | Erwin | 343—706 |
| 2,738,492 | 3/1956 | Arneson et al. | 340—87 |

NEIL C. READ, *Primary Examiner.*

T. A. ROBINSON, *Assistant Examiner.*